Aug. 2, 1927. J. S. PROWENSE Re. 16,692

WINDOW OR WINDSHIELD CLEANER

Original Filed April 11, 1924 2 Sheets-Sheet 1

J. S. Prowense
INVENTOR

BY Victor J. Evans
ATTORNEY

WITNESS:

Aug. 2, 1927. J. S. PROWENSE Re. 16,692

WINDOW OR WINDSHIELD CLEANER

Original Filed April 11, 1924 2 Sheets-Sheet 2

J. S. Prowense
INVENTOR

BY Victor J. Evans
ATTORNEY

WITNESS:

Reissued Aug. 2, 1927. Re. 16,692

UNITED STATES PATENT OFFICE.

JOSEPH S. PROWENSE, OF KANSAS CITY, MISSOURI, ASSIGNOR, BY DIRECT AND MESNE ASSIGNMENTS, TO J. A. CARSON, OF SEATTLE, WASHINGTON.

WINDOW OR WINDSHIELD CLEANER.

Original No. 1,533,944, dated April 14, 1925, Serial No. 705,880, filed April 11, 1924. Application for reissue filed July 19, 1926. Serial No. 123,495.

This invention relates to window cleaning devices and has for its object the provision of a novel squeegee device or wiper designed to be used upon a windshield of an automobile, the window of a street car vestibule or locomotive cab or in fact any other desired place for the purpose of wiping any accumulation of snow, rain or water of condensation from the glass so as to insure clear vision.

An important object is the provision of a device of this character which operates to clean or wipe both sides of the glass at the same time, means being provided for effecting the actuation in a very simple manner from the inside of the vehicle, building or other place where the device is installed.

An additional object is the provision of a mechanism of this character which will be simple and inexpensive in manufacture, easy to install, positive in action, efficient and durable in service and a general improvement in the art.

Figure 1:
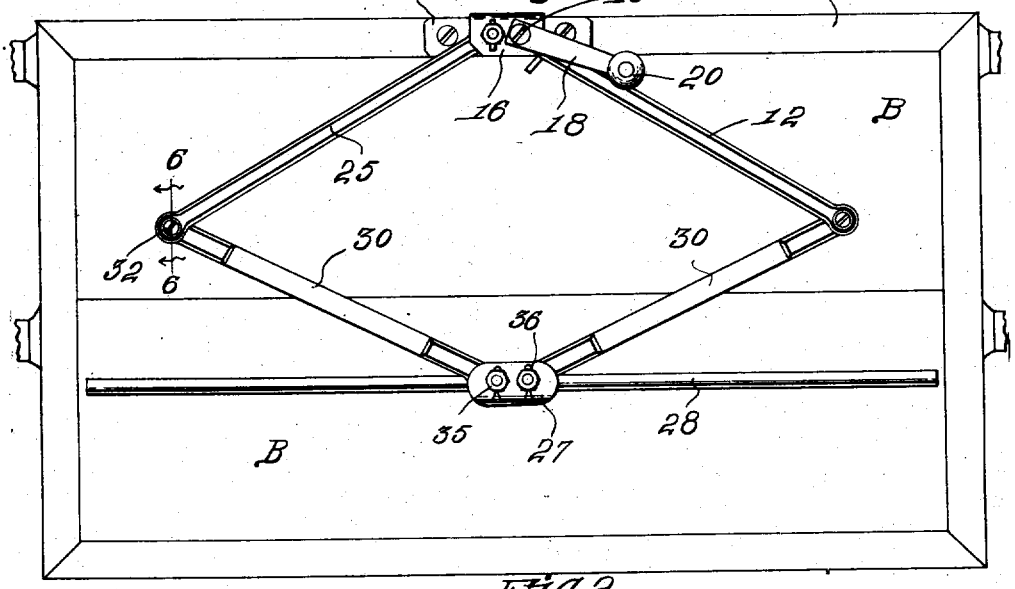
Figure 2:
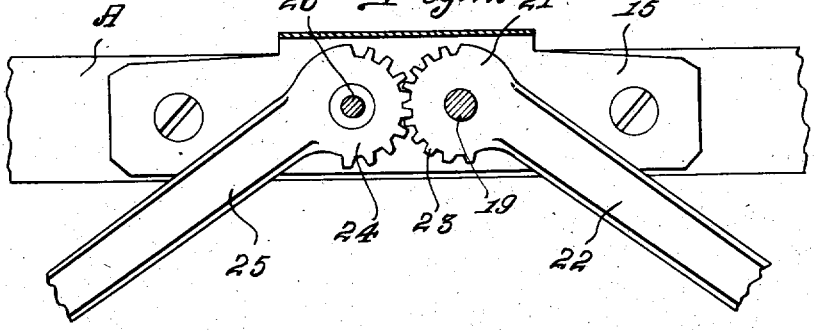
Figure 3:
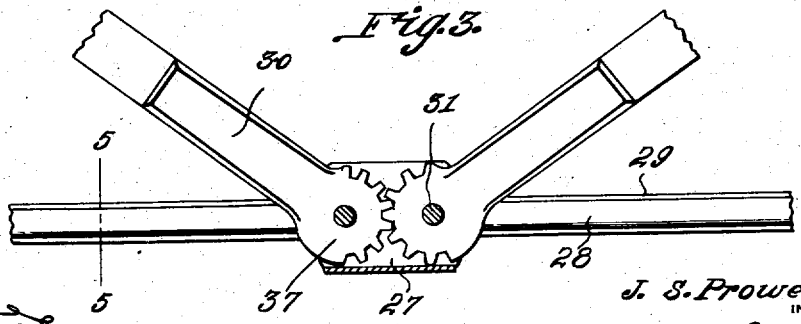
Figure 4:
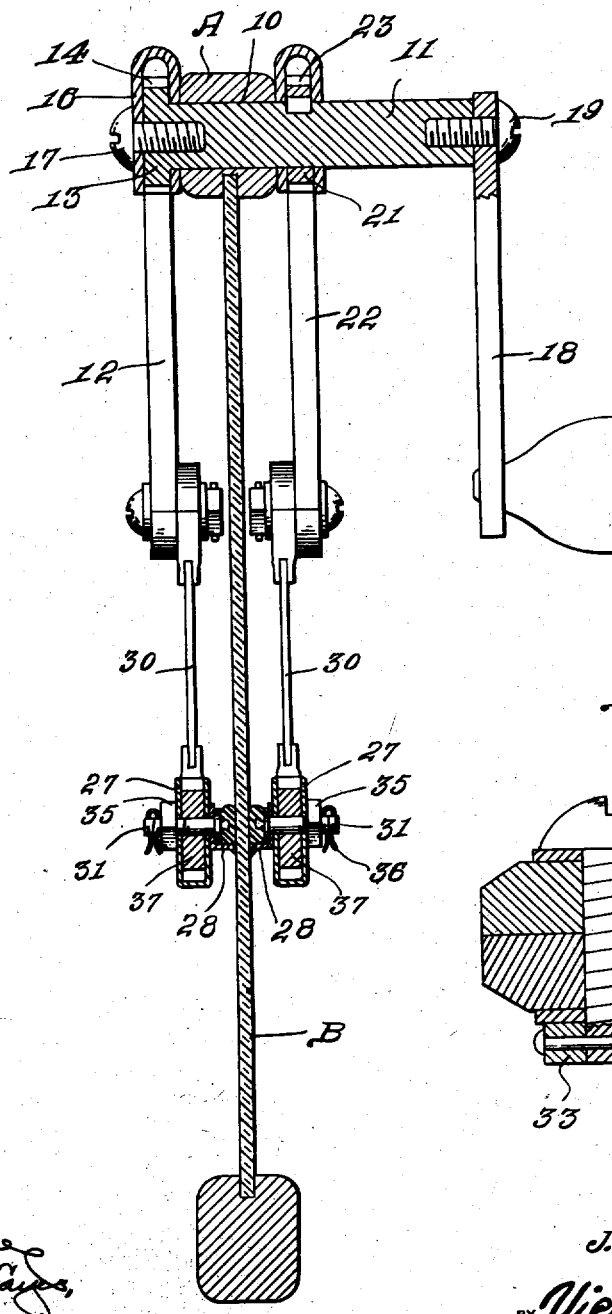
Figure 5:
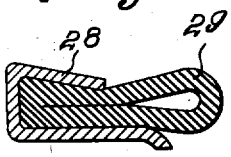
Figure 6:
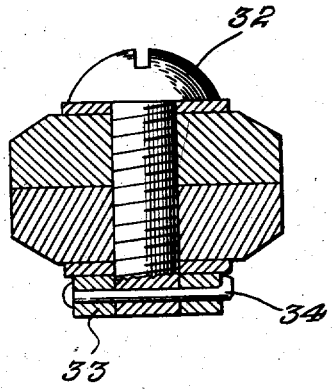

With the above and other objects and advantages in view the invention consists in the details of construction to be hereinafter more fully described and claimed and illustrated in the accompanying drawings, in which:

Figure 1 is an elevation of a windshield equipped with my device, Figure 2 is a fragmentary elevation of the upper portion of the device with parts broken away and in section, Figure 3 is a similar view of the lower portion, Figure 4 is a vertical section taken centrally through the device showing it in applied position, Figure 5 is a detail section on the line 5—5 of Figure 3, Figure 6 is a detail section on the line 6—6 of Figure 1.

Referring more particularly to the drawings I have illustrated the device as applied to a windshield including the usual frame A having a glass pane B mounted therein. While a windshield is illustrated it should be understood that the device is equally capable of attachment to a car or locomotive window or in fact any other window if desired.

In carrying out the invention I provide the frame A with a hole 10 through which is passed a shaft 11 having one end formed with or secured to an elongated arm 12 which is formed with a head 13 having segmental gear teeth 14 thereon. Secured against opposite sides of the frame A are brackets including attaching plate portions 15 having overhanging portions 16 which constitute or define housings, one of which encloses the segmental gear head 13. It should be stated that the shaft 11 passes through both of these housings and is prevented from withdrawal by a screw 17 passing through one housing and into the shaft. The other end of the shaft carries a crank handle 18 held thereto by a screw 19 and equipped with a knob 20.

Keyed or otherwise secured upon the shaft 11 at the opposite side of the frame from the arm 12 is the head 21 of a similar arm 22, which head is also formed with segmental gear teeth 23.

The toothed heads 13 and 21 mesh, respectively, with the teeth on similar heads 24 formed on arms 25 which correspond to the arms 12 and 22 and which are divergent with respect thereto. The heads 24 are pivoted at 26 within the housings 16.

I also provide a pair of elongated channel shaped brackets 27 located at opposite sides of the glass pane B and carrying squeegee members formed as angular strips 28 carrying rubber strips 29 bearing against opposite sides of the glass. Pivotally connected with the ends of the arms 12, 22 and 25, as shown in detail in Figure 3 are similar pairs of arms 30 converging and which are pivoted at 31 within the channel shaped brackets 27. The pivots connecting the arms 30 with the previously mentioned arms may consist simply of screws or bolts 32 carrying nuts 33 which are preferably cottered in place as shown at 34 and it will be observed that the pivots 31 are likewise screws or bolts carrying nuts 35 cottered as shown at 36.

The above described structure provides two sets of toggles located one at each side of the window or wind-shield glass with the squeegee strips bearing thereagainst. While it is not essential it is preferable that the meeting ends of the arms 30 be formed with segmental gear heads 37 which intermesh as shown and it is of course obvious that the pivots 31 pass through the angular strips 28 which carry the squeegee strips.

In the operation, the normal position of the parts is such that the squeegee strips are at the top of the window or windshield. When any snow, rain or water of condensation accumulates on the glass, the same may be very quickly and easily wiped off by turning the crank handle 18. When this is done, it is apparent that the rotation of the shaft 11 will cause rotation of the segmental gear heads 13 and 21 secured thereto and these heads meshing with the heads 24 will move them correspondingly. When this occurs, the arms 22 and 25 swing downwardly and toward each other, consequently forcing the arms 30 and squeegee strips downwardly. This occurs when the crank handle makes a partial revolution and upon reversing the revolution the arms 30 are drawn upwardly, dragging the squeegee strips likewise upwardly along the glass. It will be noted that this operaton is extremely simple and that no particular skill or care is required. The device is bound to act as a great safety factor in keeping clean the windshields or windows of various kinds of vehicles so that the operator may have a clear and unobstructed view of the roadway.

While I have shown and described the preferred embodiment of my invention it is of course to be understood that I reserve the right to make such changes in the form, construction and arrangement of parts as will not depart from the spirit of the invention or the scope of the subjoined claims.

The invention claimed is:

1. In a device of the character described, an attaching bracket adapted for engagement upon a window frame, a shaft journaled through the bracket and through the frame and equipped with a crank handle, a pair of toggle arms located at the opposite side of the glass, one of said arms being secured upon said shaft and having a segmental gear connection with the adjacent arm, a second pair of arms pivotally connected with the outer ends of said first named arms and arranged in converging relation with their adjacent ends geared together, and a squeegee strip carried by the ends of said last named arms.

2. In a device of the character described, a bracket adapted to be secured to a window, a pair of arms mounted adjacent said window to extend over the surface thereof, one of said arms being pivotally connected to said bracket and having a segmental gear connection with the adjacent arm, means for actuating one of said arms, a second pair of arms pivotally connected with the outer ends of said first named arms and arranged in converging relation with their adjacent ends geared together, and a squeegee strip carried by the converging ends of said last named arms.

3. In a device of the character described, a supporting bracket mounted upon a window, a pair of divergently disposed arms having adjacent inner ends associated with said bracket, means for actuating said ends for causing the opposite free ends to move toward and away from each other, a second pair of arms pivotally connected to the free ends thereof, a squeegee strip carried by the converging ends of said last mentioned arms in position to engage and wipe said window and means for maintaining said squeegee strip in fixed position relative to the line of movement thereof.

4. In a device of the character described, a supporting bracket mounted upon a window, a pair of divergently disposed arms having adjacent inner ends associated with said bracket, means for actuating said ends for causing the opposite free ends to move toward and away from each other, a second pair of arms pivotally connected to the free ends thereof, a squeegee strip carried by the converging ends of said last mentioned arms in position to engage and wipe said window and means for maintaining said squeegee strip in a plane parallel to the plane extending through the pivotal connections of said arms.

5. In a device of the character described, a bracket adapted to be secured to a window, a pair of arms mounted adjacent said window to extend over the surface thereof, one of said arms being pivotally connected to said bracket and operatively connected with the adjacent arm whereby said arms will operate simultaneously, means for actuating one of said arms, a second pair of arms pivotally connected with the outer ends of said first mentioned arms and arranged in converging relation with their adjacent ends operatively connected, and a squeegee strip carried by the converging ends of said last mentioned arms.

In witness whereof, I have hereunto affixed my signature.

JOSEPH S. PROWENSE.